US012561844B2

(12) United States Patent
Li

(10) Patent No.: US 12,561,844 B2
(45) Date of Patent: Feb. 24, 2026

(54) G-BUFFER COMPRESSION

(71) Applicant: SHARP GROWTH (CANADA) LIMITED, Toronto (CA)

(72) Inventor: Bo Li, Brossard (CA)

(73) Assignee: SHARP GROWTH (CANADA) LIMITED, Toronto (CA)

( * ) Notice: Subject to any disclaimer, the term of this patent is extended or adjusted under 35 U.S.C. 154(b) by 226 days.

(21) Appl. No.: 18/234,781

(22) Filed: Aug. 16, 2023

(65) Prior Publication Data

US 2025/0061607 A1 Feb. 20, 2025

(51) Int. Cl.
| | |
|---|---|
| *G06T 11/00* | (2006.01) |
| *G06T 9/00* | (2006.01) |
| *G09G 5/36* | (2006.01) |
| *H04N 19/20* | (2014.01) |
| *H04N 19/59* | (2014.01) |

(52) U.S. Cl.
CPC .............. *G06T 9/00* (2013.01); *G06T 11/001* (2013.01)

(58) Field of Classification Search
CPC ........ G06T 11/001; G06T 11/20; G06T 11/40; G06T 11/60; G06T 9/006; G06T 17/205; G06T 17/05; G06T 15/005; G06T 15/02; G06T 15/20; G06T 15/06; G06T 15/205; G06T 15/40; G06T 15/04; G06T 15/10; G06T 15/503; G06T 7/40; G06T 7/90; G06T 9/001; G06T 9/002; G06T 17/30; G06T 1/20; G06T 1/60; G06T 5/70; G06T 15/405; G06T 15/83; G06T 15/30; G06T 15/50; G06T 15/87; G06F 3/011; G06F 3/013; G06F 3/14; G06F 13/14; G06F 13/40; H04N 19/597; H04N 19/20; H04N 19/70; H04N 19/46; H04N 19/94; H04N 19/186; H04N 19/61; H04N 21/236; H04N 21/434; G09G 5/36

See application file for complete search history.

(56) References Cited

U.S. PATENT DOCUMENTS

| | | | | |
|---|---|---|---|---|
| 6,184,888 B1 * | 2/2001 | Yuasa | ..................... | G06T 15/10 |
| | | | | 345/419 |
| 6,252,608 B1 * | 6/2001 | Snyder | ................... | G06T 15/60 |
| | | | | 345/422 |

(Continued)

*Primary Examiner* — Wesner Sajous

(74) *Attorney, Agent, or Firm* — ARENTFOX SCHIFF LLP

(57) ABSTRACT

A method for geometry buffer compression includes generating, based on geometry information of pixels in a frame, compressed geometry information for buffering in a geometry buffer (G-buffer). The compressed geometry information includes first texture component for first pixels and omits the first texture component for at least a second pixel. The second pixel has one or more neighboring pixels in the first pixels. Further, the method includes accessing the geometry buffer to obtain the compressed geometry information, and generating reconstructed geometry information of the pixels based on the compressed geometry information. The reconstructed geometry information includes the first texture component for the second pixel that is reconstructed based on the first texture component of the one or more neighboring pixels in the first pixels. Then, the method includes performing a rendering to generate an image according to the reconstructed geometry information of the pixels.

20 Claims, 10 Drawing Sheets

(56)                    References Cited

U.S. PATENT DOCUMENTS

| | | | |
|---|---|---|---|
| 6,259,826 B1 * | 7/2001 | Pollard | H04N 1/107 |
| | | | 382/284 |
| 6,522,336 B1 * | 2/2003 | Yuasa | G07F 11/44 |
| | | | 345/428 |
| 2007/0206852 A1 * | 9/2007 | McGee | H04N 1/648 |
| | | | 382/166 |
| 2022/0366644 A1 * | 11/2022 | Seiler | G06T 15/04 |
| 2023/0162404 A1 * | 5/2023 | Tian | G06T 9/00 |
| | | | 345/420 |
| 2023/0245381 A1 * | 8/2023 | Seiler | G06F 3/011 |
| | | | 345/421 |

* cited by examiner

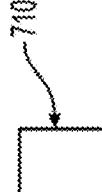

710

Shading for Pixel A:

1A: Gather buffered geometry information of Pixel B

2A: Intermediate A<=Calculations on buffered geometry information of Pixel A

3A: Intermediate B<=Calculations on buffered geometry information of Pixel B

4A: Compute rendering effects of Pixel A based on Intermediate A and Intermediate B

720

Shading for Pixel B:

1B: Gather buffered geometry information of Pixel A

2B: Intermediate A<=Calculations on buffered geometry information of Pixel A

3B: Intermediate B<=Calculations on buffered geometry information of Pixel B

4B: Compute rendering effects of Pixel B based on Intermediate A and Intermediate B

*FIG. 7*

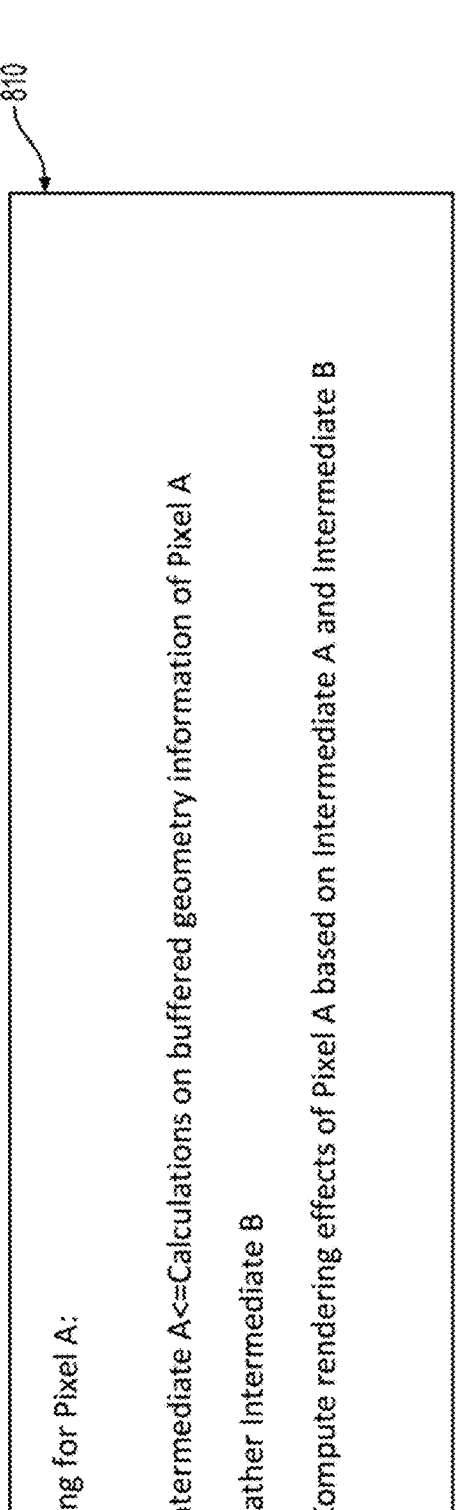

810

Shading for Pixel A:

1A: Intermediate A<=Calculations on buffered geometry information of Pixel A

2A: Gather Intermediate B

3A: Compute rendering effects of Pixel A based on Intermediate A and Intermediate B

820

Shading for Pixel B:

1B: Intermediate B<=Calculations on buffered geometry information of Pixel B

2B: Gather Intermediate A

3B: Compute rendering effects of Pixel B based on Intermediate A and Intermediate B

*FIG. 8*

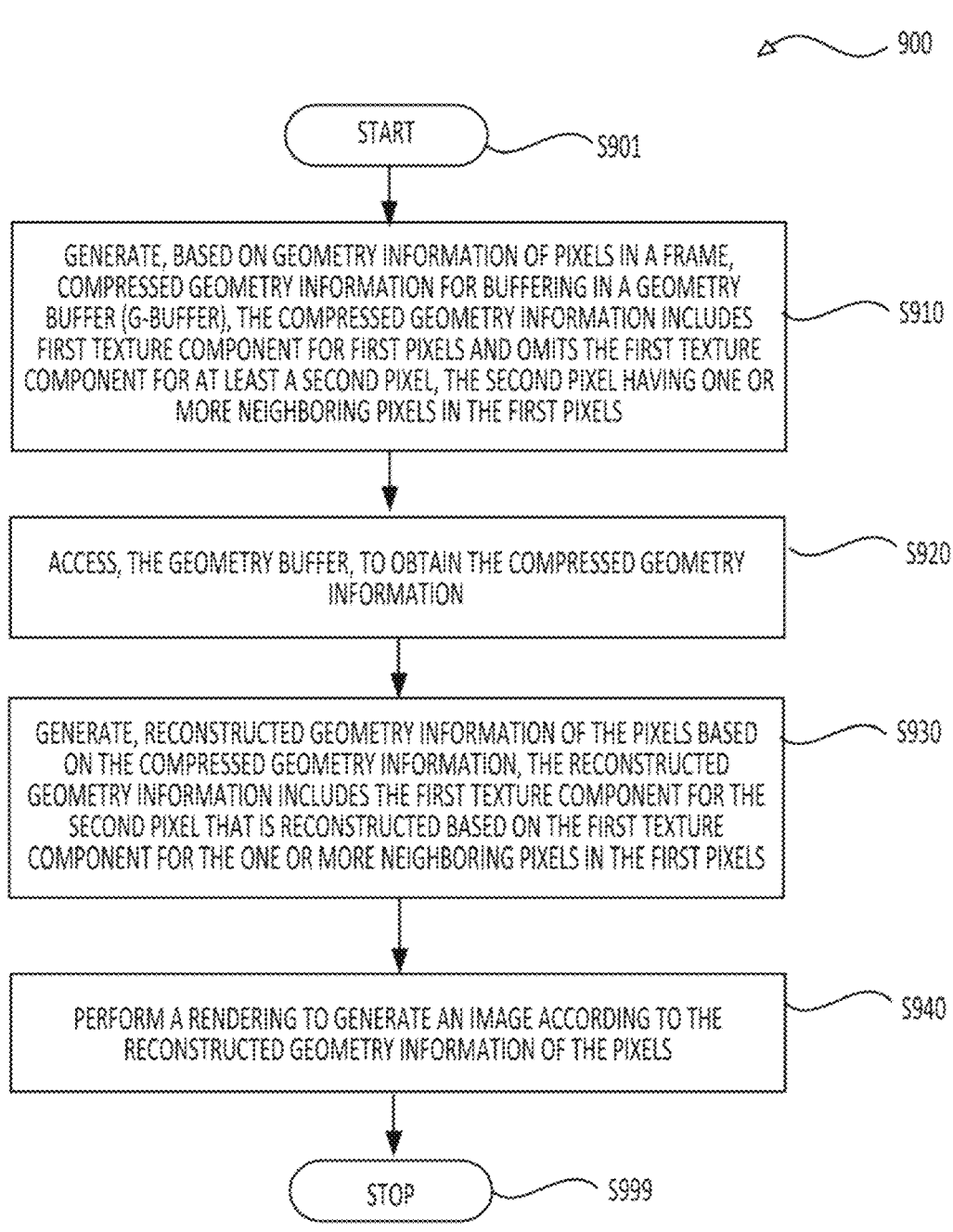

*900*

START — S901

GENERATE, BASED ON GEOMETRY INFORMATION OF PIXELS IN A FRAME, COMPRESSED GEOMETRY INFORMATION FOR BUFFERING IN A GEOMETRY BUFFER (G-BUFFER), THE COMPRESSED GEOMETRY INFORMATION INCLUDES FIRST TEXTURE COMPONENT FOR FIRST PIXELS AND OMITS THE FIRST TEXTURE COMPONENT FOR AT LEAST A SECOND PIXEL, THE SECOND PIXEL HAVING ONE OR MORE NEIGHBORING PIXELS IN THE FIRST PIXELS — S910

ACCESS, THE GEOMETRY BUFFER, TO OBTAIN THE COMPRESSED GEOMETRY INFORMATION — S920

GENERATE, RECONSTRUCTED GEOMETRY INFORMATION OF THE PIXELS BASED ON THE COMPRESSED GEOMETRY INFORMATION, THE RECONSTRUCTED GEOMETRY INFORMATION INCLUDES THE FIRST TEXTURE COMPONENT FOR THE SECOND PIXEL THAT IS RECONSTRUCTED BASED ON THE FIRST TEXTURE COMPONENT FOR THE ONE OR MORE NEIGHBORING PIXELS IN THE FIRST PIXELS — S930

PERFORM A RENDERING TO GENERATE AN IMAGE ACCORDING TO THE RECONSTRUCTED GEOMETRY INFORMATION OF THE PIXELS — S940

STOP — S999

*FIG. 9*

G-BUFFER COMPRESSION

TECHNICAL FIELD

The present disclosure describes embodiments generally related to graphics processing, and more particularly, related to compression and decompression technology for geometry information in the graphics processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In graphics processing, rendering may refer to a process of generating an image from a three-dimensional (3D) model or a two-dimensional (2D) model. In some examples, a computing system can include a graphics processing unit (GPU) for accelerating rendering, and a rendering process in a computing system may be referred to as a graphics pipeline. The graphics pipeline can include various operations, such as vertex shading operations, fragment shading operations and the like.

SUMMARY

Aspects of the disclosure provide methods and apparatuses of geometry buffer (G-buffer) compression (e.g., compress and decompress geometry information for buffering in the G-buffer). In some examples, a method for geometry buffer compression includes generating, based on geometry information of pixels in a frame, compressed geometry information for buffering in a geometry buffer (G-buffer). The compressed geometry information includes first texture component for first pixels and omits the first texture component for at least a second pixel. The second pixel has one or more neighboring pixels in the first pixels. The compressed geometry information is buffered in the geometry buffer. Further, the method includes accessing the geometry buffer to obtain the compressed geometry information, and generating reconstructed geometry information of the pixels based on the compressed geometry information. The reconstructed geometry information includes the first texture component for the second pixel that is reconstructed based on the first texture component of the one or more neighboring pixels in the first pixels. Then, the method includes performing a rendering to generate an image according to the reconstructed geometry information of the pixels.

In some embodiments, the compressed geometry information includes the first texture component for the first pixels, and second texture component for second pixels, the first pixels have a first checkerboard pattern, and the second pixels have a second checkerboard pattern that is complementary to the first checkerboard pattern. Then, the method includes buffering the first texture component for the first pixels and the second texture component for the second pixels in a channel of the geometry buffer.

In some embodiments, the compression and decompression are performed by quad. For a quad of 2 by 2 pixels that includes first two pixels in a first diagonal direction, and second two pixels in a second diagonal direction, the method includes buffering the first texture component of the first two pixels and the second texture component of the second two pixels in a channel space for the quad. Further, to generate the reconstructed geometry information, the method includes determining the second texture component of the first two pixels based on the second texture component of the second two pixels and determining the first texture component of the second two pixels based on the first texture component of the first two pixels.

In some embodiments, the method includes defining a full screen primitive to be a triangle that covers a screen space for displaying the image, and generating the reconstructed geometry information by quads that start with even pixel coordinates.

In some embodiments, shader cost can be amortized with cooperative computation. For example, to perform the rendering, the method includes performing, by a first processing unit, first operations on the first texture component for a pixel in the first two pixels to generate first intermediate result, performing, by a second processing unit, second operations on the second texture component for a pixel in the second two pixels to generate second intermediate result, exchanging the first intermediate result and the second intermediate result between the first processing unit and the second processing unit, performing, by the first processing unit, a rendering for the pixel in the first two pixels based on the first intermediate result and the second intermediate result, and performing, by the second processing unit, a rendering for the pixel in the second two pixels based on the first intermediate result and the second intermediate result.

In some examples, the second pixel has a first neighboring pixel along a first direction and a second neighboring pixel along a second direction, and to generate the reconstructed geometry information, the method includes determining, from the first direction and the second direction, a direction along which a function has a smaller gradient, and reconstructing the first texture component for the second pixel based on one of the first neighboring pixel and the second neighboring pixel that is along the direction. In some examples, to reconstruct the first texture component for the second pixel, the method includes performing an inverse math calculation of an inter-pixel gradient to obtain the first texture component of the second pixel.

In some examples, the function is pre-defined to be able to indicate a discontinuity for a surface property. The surface property includes at least one of a depth property and a material property.

In some examples, the first texture component can be at least one of a color component, a surface normal and a surface depth.

Aspects of the disclosure also provide a non-transitory computer-readable medium storing instructions which when executed by a computer cause the computer to perform the method for G-buffer compression (e.g., compress and decompress geometry information for buffering in the G-buffer).

BRIEF DESCRIPTION OF THE DRAWINGS

Further features, the nature, and various advantages of the disclosed subject matter will be more apparent from the following detailed description and the accompanying drawings in which:

FIG. 7 shows a diagram illustrating operations of a shader on two neighboring pixels in a gather-compute example.

FIG. 8 shows a diagram illustrating operations of a shader for two neighboring pixels in a compute-gather example.

FIG. 9 shows a flow chart outlining a process according to some embodiments of the disclosure.

DETAILED DESCRIPTION OF EMBODIMENTS

Figure 1:
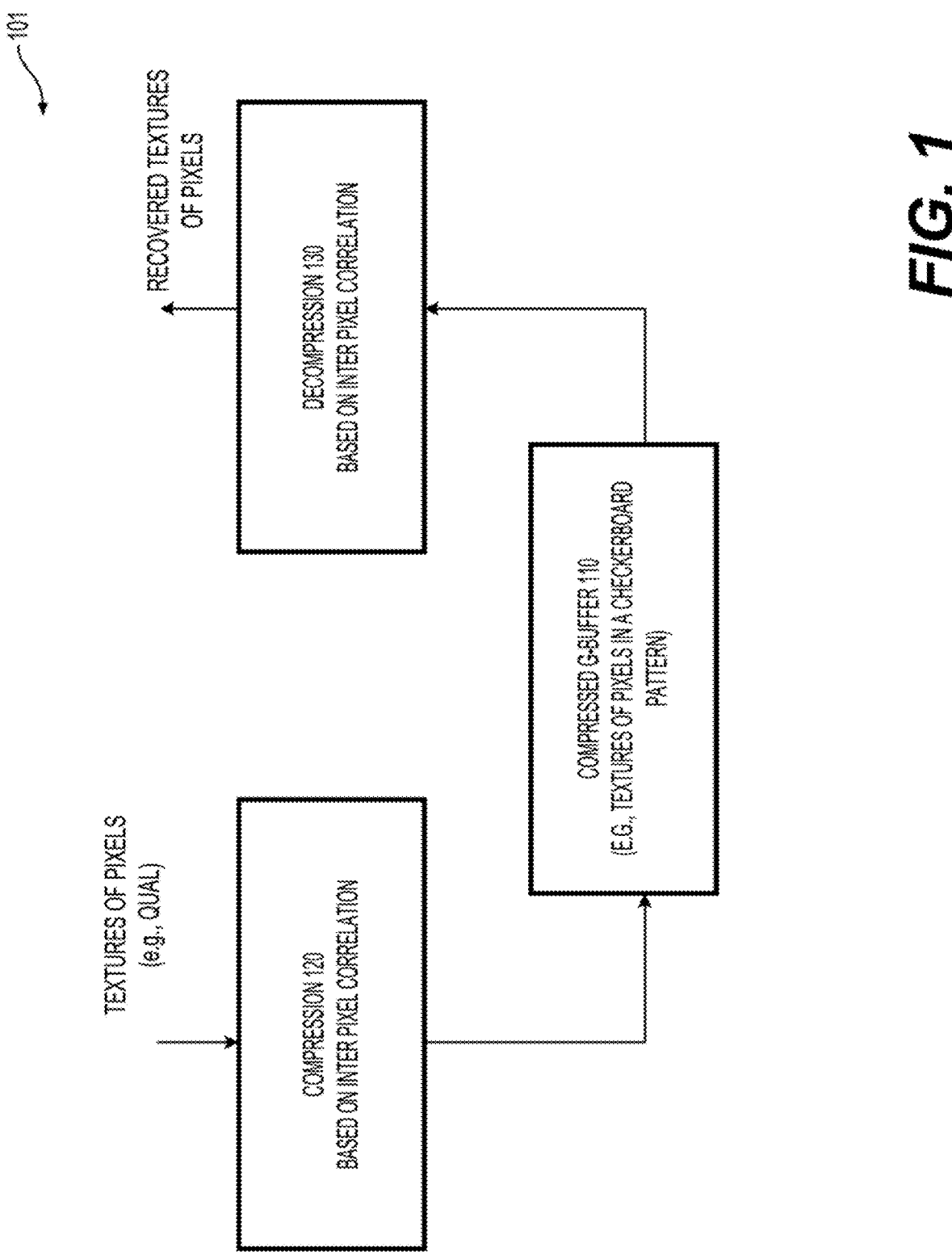
FIG. 1 shows a block diagram of a buffering module according to some embodiments of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, these concepts may be practiced without these specific details.

In the present disclosure, some technical terms are used with the following definitions.

G-Buffer is known as geometry buffer, refers to a collection of textures in which each pixel representing all kinds of geometrical information from mesh objects, such as albedo color, specular color, surface normal and surface depth, especially the ones needed for subsequent lighting calculations.

Tile-based render refers to a graphics processing unit (GPU) architecture used in, for example mobile devices for 3D graphics acceleration. The tile-based render splits the screen into small pieces (tiles) and can fragment shade a tile to completion before writing the tile out to memory.

Vulkan refers to a low-overhead, cross-platform application programing interface (API), open standard for 3D graphics and computing.

Render pass refers to, in the Vulkan concept, a subsequent of rendering operations occurred on a pre-defined set of render targets and depth buffer. Each render pass can includes one or more subpasses.

Subpass refers, in the vulkan concept, a subset of render pass, represents a distinct phase of rendering within the render pass and defines a set of input attachments, output attachments, and any intermediate attachments. During a subpass, each pixel can fetch previous subpass' output rendered data as an input attachment, but only the current pixel coordinates are allowed. In other words, not allow to fetch pixel data from arbitrary coordinates. Subpass is designed for tile-based rendering architectures.

API stands for application programming interface. Graphics APIs allow applications such as games and simulation software to efficiently access functionality of graphics acceleration hardware in a cross-vendor way.

According to some aspects of the disclosure, a rendering process may store intermediate information of fragments or pixels to be displayed. In some examples, a rendering process is performed based on deferred shading. Deferred shading refers to a method of separating (decoupling) shading of fragments (or pixels) from calculation of complicated geometry and lighting conditions. For example, the rendering process includes a first pass and subsequent pass(es), such as a second pass, and the like. On the first pass of the rendering process, data that is required for shading computation is gathered. The data (e.g., texture data) includes positions, normals, materials, and the like for each surface, and is rendered into a geometry buffer (G-buffer) using render-to-texture. The render-to-texture is a process of rasterizing into a texture map for further use as a resource in subsequent rendering passes. The G-buffer is a collection of textures by pixels in which each pixel includes various geometrical information from, for example, mesh objects, such as albedo color, specular color, surface normal, surface depth and the like, that may be needed for subsequent lighting calculations. In some examples, the G-buffer can have the same geometry as a final image (e.g., a final image generated by the rendering process), the final image and the G-buffer (e.g., texture information in a data structure organized by pixels) may correspond to each other on a one-to-one basis. In some examples, in the subsequent passes, such as in the second pass, a shader can compute the direct and indirect lighting at each pixel using the information of the texture information in screen space, such as the information in the G-buffer.

In some examples, the G-buffer can be organized into G-buffer channels corresponding to texture components. A G-buffer channel corresponding to a texture component has the same geometry for the final image and includes values of the texture component for the pixels in the final image. For example, a G-buffer channel corresponding to a surface normal includes values of the surface normal for the pixels in the final image.

Deferred shading based rendering process can be adopted by various applications, such as video games, to achieve the realistic rendering results due to ability to decouple. However, the deferred shading based rending process can have relatively large memory bandwidth requirements due to the ever-growing size of the G-buffer, since the G-buffer includes multiple textures to describe all geometrical properties for a given pixel. As ever-increasing demand for shading and lighting complexity and realism, G-buffer has to store more and more data over time. According to an aspect of the disclosure, the applications, such as the video games are executed on power-limited electronic devices, such as executed by GPUs in mobile phone, tablet device and the like. In some examples, large G-buffer can result in GPU using lots of power just to move pixel data around the external bus to/from DRAM, and can reduce parallelism due to limited on-chip memory, and force a reduction of tile size for tile based rendering.

Some aspects of disclosure provide compression techniques for compressing G-buffer, and reducing G-buffer size. In some examples, the G-buffer size can be reduced up to 2:1 ratio. The compression techniques can greatly reduce storage and bandwidth requirements of G-buffer, at the same time without data-quantization quality loss. In some examples, the compression techniques can overcome a hardware limitation for tiled-based rendering architecture that restricts access only to the current pixel and lacks ability to explore inter-pixel data correlations.

In a first related example, a related G-buffer compression technique leverages bit-packing techniques to reduce data size, for example reducing an 8 bits per-channel to 6 bits per-channel. The first related example can cause quantization/banding visual artifacts to some extent, and the algorithm in the first related example is labor intensive. Also, the algorithm in the first related example operates on single pixel, does not exploit data-correlation between pixels.

In a second related example, a related G-buffer compression technique compresses surface normal from 2×16 bits to 3×8 bits, a 25% percent reduction. However, the algorithm in the second related example is specifically designed for compressing normal vector, is not suitable for other geometrical data such as color data and the like.

According to an aspect of the disclosure, generally, neighboring pixels likely have very similar data since the neighboring pixels likely share the same material or geometry. The present disclosure can provide some compression techniques that can compress G-buffer by exploring data correlations between pixels. The compression techniques can be used by any video games, such as a video gaming requiring compression on real-time generated images, a video game using deferred shading pipeline, and the like. While deferred shading pipeline is used to illustrate the compression techniques in the present disclosure, the compression techniques can be used in other suitable applications, such as an application including real-time 2D image compression/decompression.

FIG. 1 shows a block diagram of a buffering module (101) according to some embodiments of the disclosure. The buffering module (101) can be used in any suitable graphics processing system for geometry buffering to manage a collection of geometrical information by pixels. The buffering module (101) includes a compression module (120), a compressed G-buffer (110) and a decompression module (130). The buffering module (101) can receive textures of pixels as inputs, compress the textures, and buffer the textures of pixels in the compressed form. Further, when the buffering module (101) is accessed to output, the buffering module (101) can decompress the buffered textures of pixels, and output recovered (reconstructed) textures of pixels. In some examples, the buffering module (101) is implemented in software, and the compression module (120) and the decompression module (130) are implemented as software instructions that can be executed by processing circuitry.

According to an aspect of the disclosure, the buffering module (101) operates on pixel group level (multiple pixels in a group) instead of pixel level (single pixel), and can exploit data correlation in each pixel group. For example, the buffering module (101) operates on a quad level that a quad includes 2×2 pixels, and can exploit data correlation between pixels in the quad. In some video game examples, a frame to display on screen can include millions of pixels, but roughly in the order of thousands of objects, hence the chances of neighbor pixels sharing the same object/texture setting is very high.

It is noted that, in some examples, exploiting more pixel data correlation can have more chance for a compression algorithm to work more efficiently without scarifying quality. In some examples, larger pixel group, such as 4×4 and the like, can be used to improve compression efficiency. According to an aspect of the disclosure, some 3D graphics acceleration hardware operates on quad level (2×2 pixels), using qual level can reduce algorithm complexity. In some examples, while a larger group (larger than a quad) can improve compression efficiency, the larger group may require greatly increased algorithm complexity, to the point where real-time processing might no longer be feasible especially on low power devices (e.g., mobile devices).

According to an aspect of disclosure, the compression module (120) is configured to sample one or more texture components for pixels in space for compression. In some examples, the compression module (120) samples a texture component for pixels in space, for example using a checkerboard pattern, for compression. Further, the compression module (120) can sample two texture components for pixels using complementary checkerboard patterns, thus the two texture components for pixels can be stored in a memory space originally for one texture component of the pixels to achieve a compression ratio of 2:1.

In some embodiments, to compress RGB color (including R, G and B components) of pixels, the RGB color of each pixel is converted into YCoCg color space losslessly into a luma (Y) component (that is more human-eye sensitive) and two chroma (Co and Cg) components (that are less sensitive to human eyes). In some examples, the Y component of pixels is buffered in full spatial resolution in a G-buffer channel that allows preservation of all luma details, and chroma components are sampled by complementary checkerboard patterns with half spatial resolution and buffered in a G-buffer channel to achieve 2:1 compression ratio.

Figure 2:
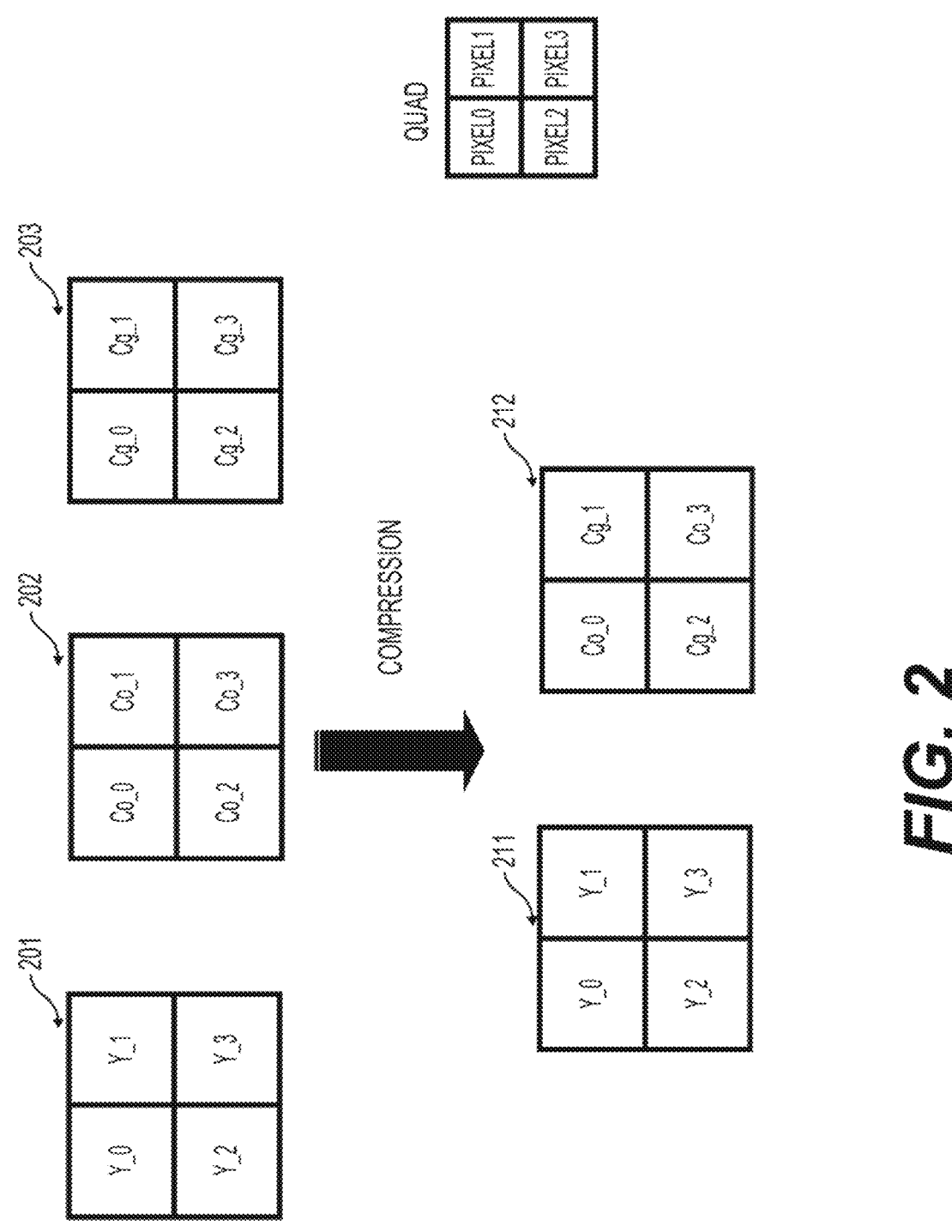
FIG. 2 shows a diagram of color compression in some examples.

FIG. 2 shows a diagram of color compression in some examples. In the FIG. 2 example, the color of a quad (2×2 pixels) includes Y component (201) of the quad, Co component (202) of the quad, and Cg component (203) of the quad. The quad includes four pixels that are denoted by 0, 1, 2 and 3. The Y component (201) of the quad includes values $Y\_0, Y\_1, Y\_2$ and $Y\_3$; the Co component (202) of the quad includes $Co\_0, Co\_1, Co\_2$ and $Co\_3$; and the Cg component (203) of the quad includes $Cg\_0, Cg\_1, Cg\_2$ and $Cg\_3$.

The compression module (120) can provide the Y component (201) of the quad in full spatial resolution to a G-buffer channel (e.g., the Y component) as a buffered quad (211), and thus allow preservation of all luma details.

The compression module (120) can sample the chroma components, such as the Co component (202) and the Cg component (203), with half spatial resolution using complementary checkerboard patterns. The compression module (120) can assemble the sampled data into a mixed quad (212), and provide the mixed quad to a G-buffer channel (e.g., for the compressed chroma components) for buffering. The compression module (120) achieves 2:1 compression ratio for the chroma components. The mixed quad (212) includes $Co\_0$, and $Co\_3$ of the Co component (202), and includes $Cg\_1$ and $Cg\_3$ of the Cg component (203).

It is noted that the compression module (120) operates on the quad level instead of pixel level compression, and achieves various advantages over the related examples. In an example, the G-buffer channels can have full numeric resolution (e.g., 8 bits) as the textures of the pixels in the input, thus no data-quantization errors for the compression, and color banding artifacts are not generated due to the compression. Further, compressed data can be stored in the G-buffer channels without any bit-packing (for instance, pack 2 four-bit channel into a single 8 bit channel), thus the use of the compression module (120) allows fully hardware accelerated frame-buffer operations, such as blending and accumulation. It is noted that the bit-packing may rely on software solutions which first decompress and expand the packed channels in shader, and then blending and re-packed blended bits into compressed channel. The software solutions consume arithmetic-logic unit (ALU) cycles, and are slower than hardware circuit and also consume much more power than the hardware circuit. No bit-packing can be very important in video games for effects like "deferred decals" which rely heavily on G-buffer blending, as decals are blended with G-buffer channels after the main scene was rendered. Further, working on the quad level can allow exploitation of data correlation in compression. For example, exploitation of data correlation can allow better quality at the same compression ratios, or same quality with better compression ratio.

It is noted that the compression in FIG. 2 is for illustration, and can be suitable modified. For example, the sampling patterns for the two chroma components can be switched.

The decompression module (130) is configured to perform quad-level decompression. For a texture component that is buffered in a checkerboard pattern, the decompression module (130) can determine the value at a pixel with missing texture component information based on texture component information of neighboring pixel(s).

It is noted that due to restrictions on mobile GPU and APIs, it may not be easy to access neighboring pixel(s). In some examples, APIs are limited to access single pixel. In some examples, a mobile GPU uses a tile based rendering architecture. The tile based rendering architecture divides screen into many tiles and renders each of the tiles one by one using on-chip memory (e.g., static random access memory on a same chip as the GPU). The rendered tile is written out to external memory, such as dynamic random access memory (DRAM). When operations are mostly utilizing on-chip memory, external bandwidth requirement is greatly reduced, power consumption can be reduced, mobile user experiences can be improved. In the tile based rendering architecture, when a pixel lies on a tile boundary, the immediate neighbor may be outside of the tile, and is not available in the on-chip memory. In some examples, APIs, such as framebuffer fetch, Vulkan subpass, pixel local storage and the like have strictly limited frame buffer access to the current pixel coordinates.

However, according to an aspect of the disclosure, the internal pipeline of GPU for pixel processing can process pixels with quad as the basic unit, rather than individual pixels. The internal pipeline of GPU for pixel processing needs gradient information for various purposes such as depth-slope, mip-map calculations, which can be computed very efficiently with the help of a neighboring pixel.

In some examples, for tile-based rendering architecture, the tile size is generally multiple of two. Thus, even for pixels lie on a tile boundary, as long as the beginning coordinate of the current full-screen primitive is multiple of two, a quad will never cross a tile boundary. In various implementation examples, quads in GPUs are all align with even pixel coordinates.

In some embodiments, the full screen primitive is set to be a single over-sized triangle that fully covers the screen.

Figure 3:
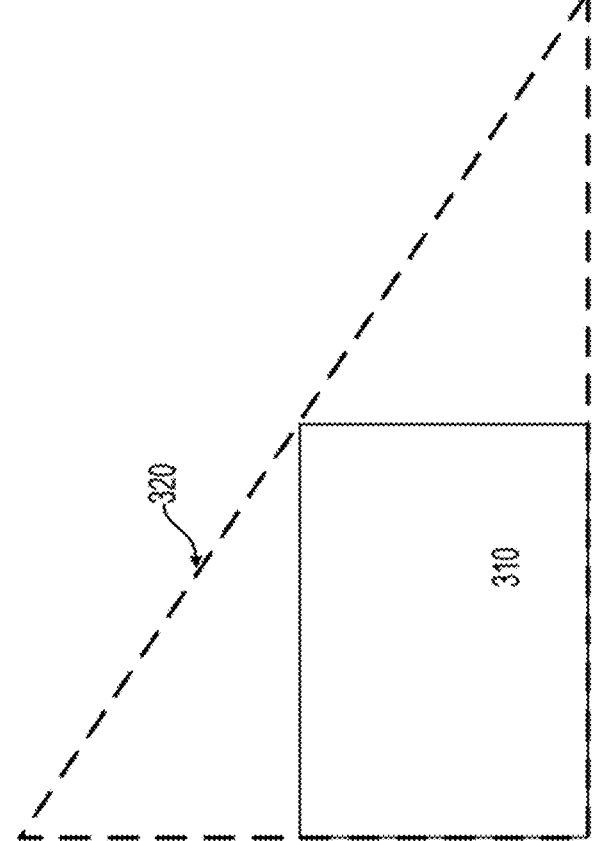
FIG. 3 shows a diagram for setting a screen primitive in some examples.

FIG. 3 shows a diagram illustrating a screen (310), and a primitive (320) in some examples. The primitive (320) is set as a single over-sized triangle that fully covers the screen (310). The beginning of the primitive (320) is set to 0. Thus, quads can be ensured to start with even pixel coordinates. It is noted that, in some related examples, the primitive is set as two small triangles covering the screen, thus some quads may have diagonal line crossing the viewport where odd coordinates might occur.

In some embodiments, GPUs may have infrastructure to support quad based decompression, and have some intrinsic instructions that can perform inter pixel operations. The intrinsic instructions that can perform inter pixel operations can be used to support quad based decompression. In some examples, GPUs can operate on quads to generate inter-pixel gradient (finite difference) in response to some intrinsic instructions (also referred to as inter-pixel gradient intrinsic instructions). Then, a texture value of a neighbor pixel can be obtained using inverse math calculations for the inter-pixel gradient and the texture value of the current pixel. In an example, intrinsic functions ddx, ddx_coarse, ddx_fine can return the partial derivative with respect to the screen space x coordinate; and intrinsic functions ddy, ddy_coarse, ddy_fine can return the partial derivative with respect to the screen space y coordinate. Thus, a texture value of a neighbor pixel can be obtained based on the intrinsic functions (e.g., ddx, ddx_coarse, ddx_fine, ddy, ddy_coarse, ddy_fine) and the texture value of the current pixel. It is noted that GPUs generally support quad based operations and inter-pixel gradient intrinsic instructions. Thus, decompression using quad based operations and inter-pixel gradient intrinsic instructions can be performed by most GPUs, and thus decompression using quad based operations and inter-pixel gradient intrinsic instructions can be cross-platform and cross-vendor.

In some embodiments, the decompression module (130) can decode checkerboard interleaved quads by filling missing data according to immediate neighboring pixels.

It is noted that filing data using a neighboring pixel in a fixed direction (e.g., a horizontal (or vertical) neighboring pixel) can introduce artifacts especially on pixel neighbors.

According to an aspect of the disclosure, the decompression module (130) can leverage inter-pixel gradients to select optimal neighboring pixels. The compressed G-buffer (110) buffers the texture components for pixels in a checkerboard pattern, for missing data at each pixel, two immediate neighboring pixels, such as a horizontal neighboring pixel and a vertical neighboring pixel, can provide the missing data. The decompression module (130) can leverage this flexibility to have much better chance to select the best fitting missing data, instead of just a pre-defined one which leads to aforementioned artifacts.

In some examples, a numerical local function f(x,y) to define the likelihood of surface properties can be setup by a user. In an example, the numerical local function f(x,y) can be set based on the depth of the current pixel, and the numerical local function f(x,y) is able to be indicative of geometrical discontinuity. In another example, the numerical local function f(x,y) can be set based on a combination of the depth of and material (e.g., Material_ID) of the current pixel, thus the numerical local function f(x,y) can be used to identify the best fit neighbor with extra information of material discontinuity. In some examples, after the numerical local function f(x,y) is evaluated for the current pixel, the gradient of the numerical location function, such as partial derivative with respect to the x coordinate (e.g., df(x,y)/dx) and partial derivative with respect to the y coordinate (df(x,y)/dy) can be determined, for example, using the inter-pixel gradient intrinsic instructions. The partial derivative with respect to the x coordinate and the partial derivative with respect to the y coordinate are compared. Then, one of the horizontal neighboring pixel and the vertical neighboring pixel can be selected based on the comparison to fill the missing data. For example, the comparison can indicate the smaller gradient from the partial derivatives of the numerical local function, thus the neighboring pixel along the smaller gradient can be selected to fill the missing data of the current pixel, thus missing data is determined from the most likely neighboring pixel that belongs to the same geometry or material instances as the current pixel. Thus, higher quality reconstruction of missing data can be achieved.

Figure 4:
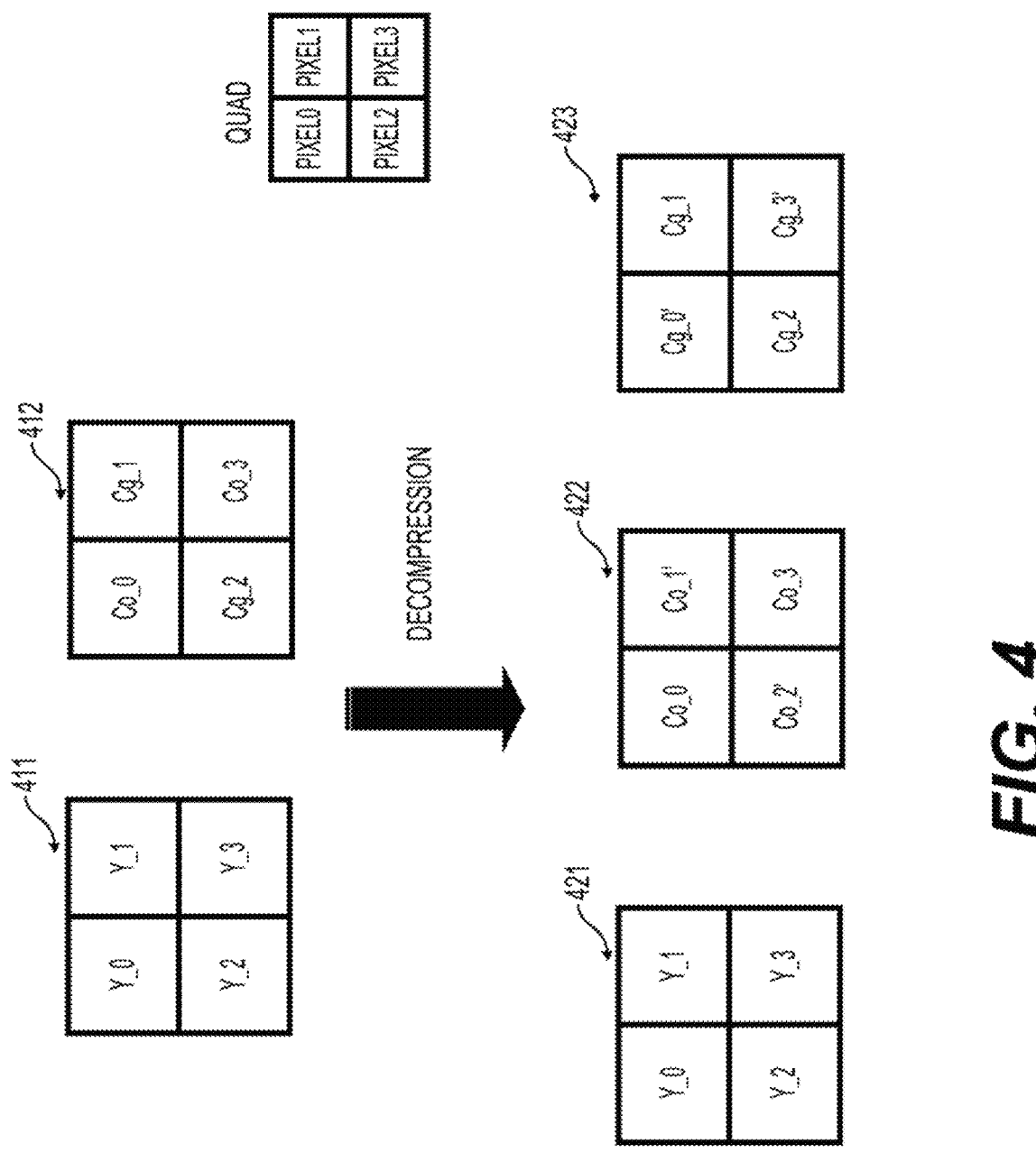
FIG. 4 shows a diagram of color decompression in some examples.

FIG. 4 shows a diagram of color decompression in some examples. In the FIG. 4 example, the color of a quad (2×2 pixels) is buffered as a first buffered quad (411) in a first G-buffer channel (e.g., for Y component), and a second buffered quad (412) in a second G-buffer channel (e.g., mixed Co and Cg components). The first buffered quad (411) is similar to the buffered quad (211) in FIG. 2, includes luma information in the full spatial resolution, and allows preservation of all luma details. The second buffered quad (412) is similar to the mixed quad (212) in FIG. 2, includes Co information and Cg information in complementary checkerboard patterns.

In some examples, the decompression module (130) can provide the first buffered quad (411) as the Y component (421) of a reconstructed quad. Further, the decompression module (130) can reconstruct the Co component (422) and the Cg component (423) of the reconstructed quad based on the second buffered quad (412) in the second G-buffer channel.

Using the Co information at pixel 1 as an example, the decompression module (130) can determine Co_1' based on Co_0 and Co_3. For example, the decompression module (130) can evaluate the gradient of a numerical location function (e.g., a combination of depth and material) for the current pixel (pixel 1) having missing information, such as partial derivative with respect to the x coordinate and partial derivative with respect to the y coordinate, for example, using the inter-pixel gradient intrinsic instructions. For example, the decompression module (130) compares as partial derivative of the numerical location function with respect to the x coordinate and partial derivative of the numerical location function with respect to the y coordinate, and determines which one of the x direction and y direction has the smaller partial derivative. When the partial derivative with respect to the x coordinate is smaller than the partial derivative with respect to the y coordinate, the decompression module (130) can determine Co l' based on the Co_0; when the partial derivative with respect to the y coordinate is smaller than the partial derivative with respect to the x coordinate, the decompression module (130) can determine Co_1' based on the Co_3.

Similarly, the decompression module (130) can determine Co_2' based on Co_0 and Co_3; determine Cg_0' based on Cg_1 and Co_2; determine Cg_3' based on Cg_1 and Cg_2.

Figure 5:
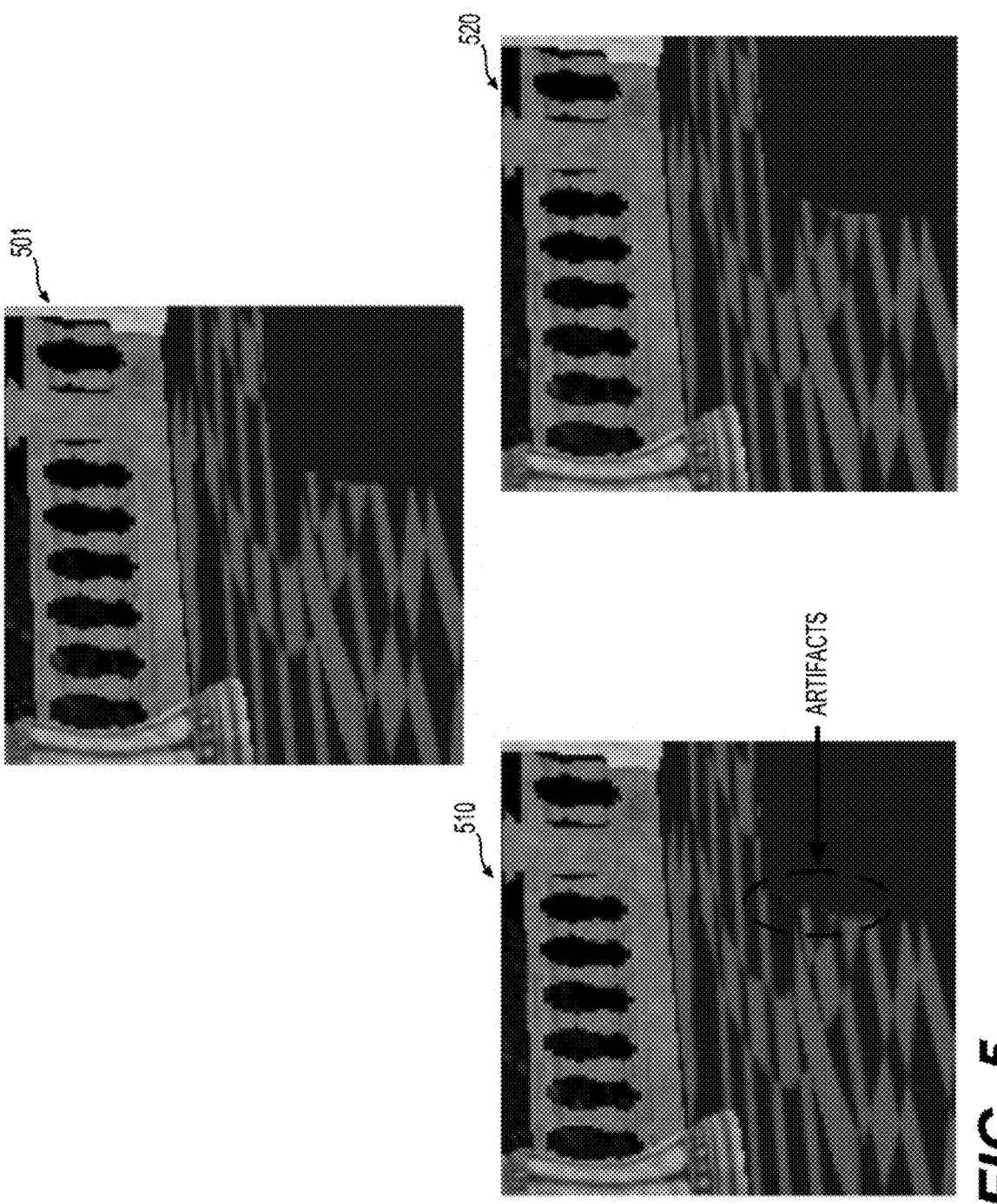
FIG. 5 shows a diagram of images for comparing results of a related compression example and the geometry buffer compression in the present disclosure.

FIG. 5 shows a diagram of images for comparing results of a related compression example and the G-buffer compression example in the present disclosure. In FIG. 5, a first image (501) is an original image, a second image (510) is a reconstructed image based on a related chroma sub-sampling technique, a third image (520) is a reconstructed image based on the G-buffer compression technique disclosed in the present disclosure. In an example, the related chroma sub-sampling technique uses 4:2:2 sub-sampling that samples the chroma components with ½ horizontal resolution and full vertical resolution. Thus, during reconstruction, missing chroma values are filled by neighboring pixels in one fixed direction, such as horizontal direction.

As shown in FIG. 5, the second image (510) includes artifacts that are introduced by the related chroma sub-sampling technique. The third image (520) does not have the artifacts that are appeared in the second image (510). The G-buffer compression technique achieves higher quality reconstruction of the chroma information than the related chroma sub-sampling technique.

It is noted that the G-buffer compression technique can be used for any suitable texture components, and can be used in any suitable graphics processing pipeline.

Figure 6:
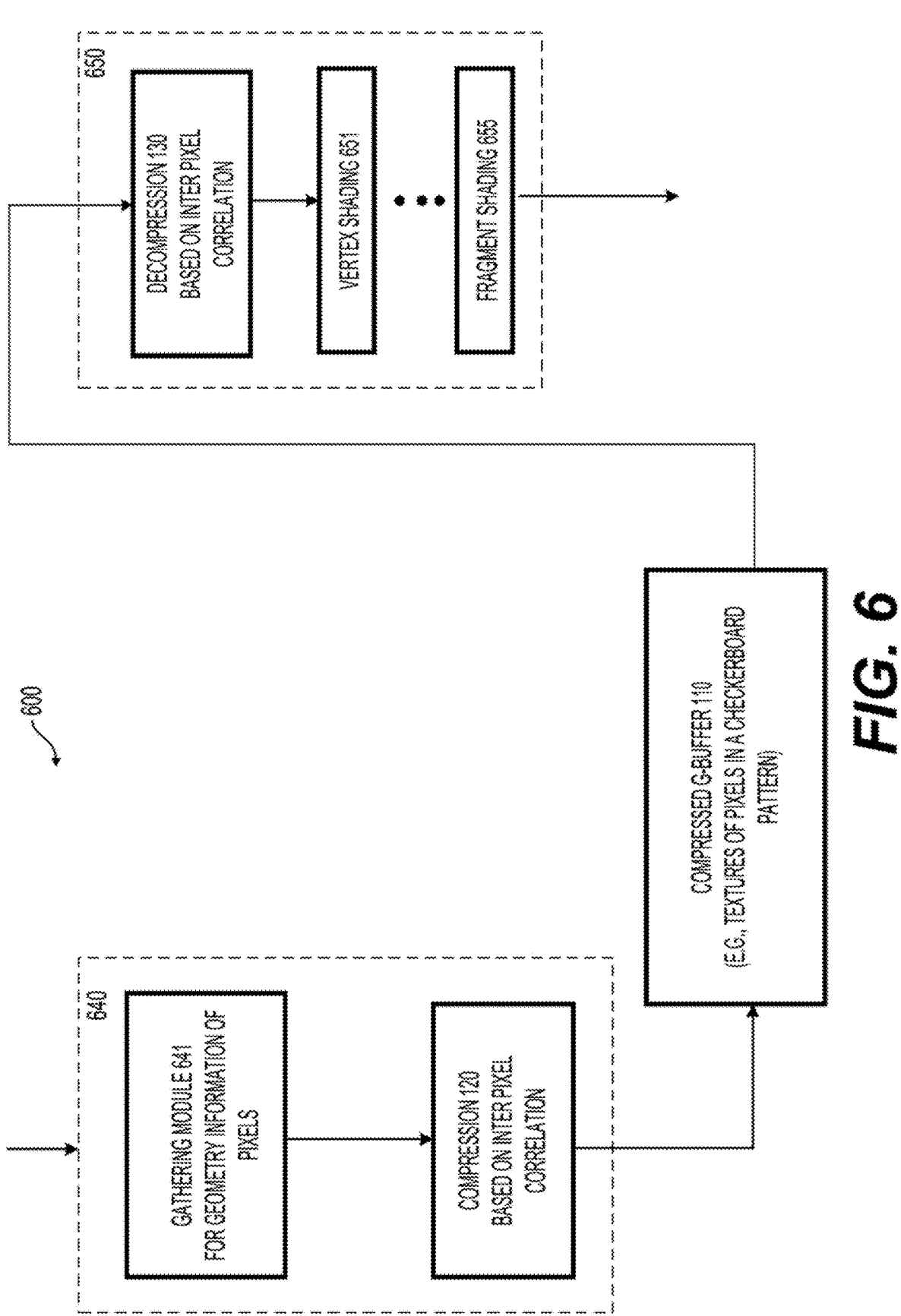
FIG. 6 shows a diagram of a graphics processing pipeline according to some embodiments of the disclosure.

FIG. 6 shows a diagram of a graphics processing pipeline (600) according to some embodiments of the disclosure. The graphics processing pipeline (600) is configured for deferred shading according to an embodiment. In some examples, the graphics processing pipeline (600) is implemented in software instructions that can be executed by one or more GPUs to perform graphics processing operations.

In the FIG. 6 example, the graphics processing pipeline (600) include a first pass (640) and a second pass (650). The first pass (640) includes, for example the compression module (120) at the output of the first pass (640) and the second pass (650) includes, for example the decompression module (130) at the input of the second pass (650). The first pass (640) can generate geometry information of pixels and compress the geometry information of pixels for buffering into compressed G-buffer (110). The second pass (650) can access the compressed G-buffer (110), reconstruct geometry information of pixels, and perform additional graphics processing operations to generate a final image in an example.

In some examples, the first pass (640) may include some processing modules, such as a gathering module (641) for gathering geometry information of pixels, and the like, and the second pass (650) may also include some processing modules, such as a vertex shading module (651), a fragment shading module (655) and the like. In some embodiments, the vertex shading module (651) and the fragment shading module (655) of the second pass (650) may be referred to as deferred shading.

In some embodiments, the gathering module (641) can perform suitable geometry calculations to determine the geometry information by pixels without considering lighting. The geometry information may be needed for subsequent lighting calculations. The vertex shading module (651) and the fragment shading module (655) in the second pass (650) can perform further processing, such as shading, lighting and shadow calculation. In some examples, the vertex shading module (651) and the fragment shading module (655) in the second pass (650) can perform shading calculations on portions that are affected by lighting.

According to an aspect of the disclosure, when the geometry information of pixels is buffered in an interleaved pattern, such as the checkerboard pattern, not only the storage space of texture components can be amortized, the computation cost can be amortized among pixels.

In some examples, a technique that is referred to as cooperative computation is used in the second pass, such as for decompression, shading and the like. For example, a shading of a current pixel may include operations on geometry information of a neighboring pixel. In an example (referred to as gather-compute example), for the decompression or shading of the current pixel, geometry information of the neighboring pixel is gathered, and computations are performed on current pixel and the neighboring pixel. In the gather-compute example, computations of the current pixel and computations of the neighboring pixel can have redundant portion.

FIG. 7 shows a diagram illustrating operations of a shader on two neighboring pixels (pixel A and pixel B) in the gather-compute example. For shading of pixel A, buffered geometry information of pixel A is available, and operations to calculate the rendering effects of pixel A are shown as (710). For shading of pixel B, buffered geometry information of pixel B is available, and operations to calculate the rendering effects of pixel B are shown as (720). In some examples, the operations (710) and the operations (720) are performed in parallel. As shown by (710) and (720), operations 2B-3B are redundant to operations 2A-3A.

In another example (referred to as compute-gather example), operations on the buffered geometry information of individual pixels are performed to generate intermediate results. The intermediate results can be exchanged, and the calculations of the rendering effects can be performed.

FIG. 8 shows a diagram illustrating operations of a shader for two neighboring pixels (pixel A and pixel B) in the compute-gather example. For shading of pixel A, buffered geometry information of pixel A is available, and operations to calculate the rendering effects of pixel A are shown as (810). For shading of pixel B, buffered geometry information of pixel B is available, and operations to calculate the rendering effects of pixel B are shown as (820).

In some examples, the calculations in the compute-gather example are reduced by roughly ⅓ compared to the gather-compute example.

The compression techniques for G-buffer in the present disclosure can provide various benefits. For example, the compression techniques for G-buffer in the present disclosure can support compression on G-buffer with little loss in terms of quality, and can save bandwidth and storage space. Further, the compression techniques for G-buffer in the present disclosure can support hardware accelerated G-buffer blending that can be used to generate certain effects such as decal rendering. In addition, the compression techniques for G-buffer in the present disclosure can increase mobile GPU tiled-based rendering performance. For example, by reducing memory storage overhead per-tile, thus the pixel count for each tile (bin) can be increased (e.g., for the same amount of on chip memory) and the total tile number for the same resolution can be decreased. As a result, vertex workload is decreased and pixel parallelism is improved in processing each tile. In an example, on a mobile architecture, pixel count of each tile can be increased from 240×192 to 240×288, and total tile number per-frame can be decreased from 27 to 18 when the compression techniques for G-buffer in the present disclosure are applied.

Further, in some examples, algorithms to amortize computations with minimized instruction overhead can be used when the compression techniques for G-buffer in the present disclosure are applied.

FIG. 9 shows a flow chart outlining a process (900) according to an embodiment of the disclosure. In some embodiments, the process (900) is implemented as software instructions, thus when processing circuitry executes the software instructions, the processing circuitry performs the process (900). The process starts at (S901) and proceeds to (S910).

At (S910), based on geometry information of pixels in a frame, compressed geometry information for buffering in a geometry buffer (G-buffer) is generated. The compressed geometry information includes first texture component for first pixels and omits the first texture component for at least a second pixel, the second pixel has one or more neighboring pixels in the first pixels. The compressed geometry information is buffered in the G-buffer in a plurality of channels (also referred to as G-buffer channels). Each channel buffers information of one or more texture components.

At (S920), the geometry buffer is accessed to obtain the compressed geometry information.

At (S930), reconstructed geometry information of the pixels is generated based on the compressed geometry information. The reconstructed geometry information includes the first texture component for the second pixel that is reconstructed based on the first texture component of the one or more neighboring pixels in the first pixels.

At (S940), a rendering is performed to generate an image according to the reconstructed geometry information of the pixels.

According to an aspect of the disclosure, the compressed geometry information includes the first texture component for the first pixels, and second texture component for second pixels. The first pixels have a first checkerboard pattern in a screen space (e.g., pixels for display on a screen) and the second pixels have a second checkerboard pattern that is complementary to the first checkerboard pattern. In an example, a combination of the first pixels and the second pixels can fully fill the screen space. In some examples, the first texture component for the first pixels and the second texture component for the second pixels are buffered in a channel of the geometry buffer. Each entry in the channel of the geometry buffer corresponds to a pixel in the screen space, and stores a value that is either the first texture component for the pixel or the second texture component for the pixel.

In some examples, the compression and the decompression of the geometry information are performed by quad. In some examples, for a quad of 2 by 2 pixels that includes first two pixels in a first diagonal direction, and second two pixels in a second diagonal direction, to generate the compressed geometry information (e.g., compression), the first texture component of the first two pixels and the second texture component of the second two pixels can be buffered in a channel space for the quad in a channel of the geometry buffer. Further, in some examples, to generate the reconstructed geometry information (e.g., decompression), the second texture component of the first two pixels is determined based on the second texture component of the second two pixels, and the first texture component of the second two pixels is determined based on the first texture component of the first two pixels.

In some embodiments, to make sure that the quads start at the even pixel coordinates, a full screen primitive is defined to be a triangle that covers a screen space for displaying the image. Thus, the compression and decompression can be performed safely by quads that start with even pixel coordinates.

In some embodiments, operations by shader can be amortized with cooperative computation. For example, to perform the rendering, pixels can be rendered in parallel by multiple processing units. In an example, a first processing unit can perform first operations on the first texture component for a pixel in the first two pixels to generate first intermediate result; a second processing unit can perform second operations on the second texture component for a pixel in the second two pixels to generate second intermediate result. The first intermediate result and the second intermediate result are exchanged between the first processing unit and the second processing unit. The first processing unit can perform a rendering for the pixel in the first two pixels based on the first intermediate result and the second intermediate result. The second processing unit can perform a rendering for the pixel in the second two pixels based on the first intermediate result and the second intermediate result.

In some examples, the second pixel has a first neighboring pixel along a first direction (e.g., one of horizontal direction and vertical direction) and a second neighboring pixel along a second direction (e.g., the other of the horizontal direction and the vertical direction). To generate the reconstructed geometry information, in some examples, from the first direction and the second direction, a direction along which a function at the second pixel has a smaller gradient can be determined. Then, the first texture component for the second pixel can be reconstructed based on one of the first neighboring pixel and the second neighboring pixel that is along the direction. The function can be a pre-defined function to indicate a continuity or a discontinuity for a surface property. The surface property can include at least one of a depth property and a material property.

The first texture component can be any suitable texture component, such as one of a color component (e.g., one of the chroma components for color information), a surface normal, a surface depth and the like.

In some examples, to reconstruct the first texture component for the second pixel, an inverse math calculation of an inter-pixel gradient can be performed to obtain the first texture component for the second pixel.

Then, the process proceeds to (S999) and terminates.

The process (900) can be suitably adapted. Step(s) in the process (900) can be modified and/or omitted. Additional step(s) can be added. Any suitable order of implementation can be used.

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
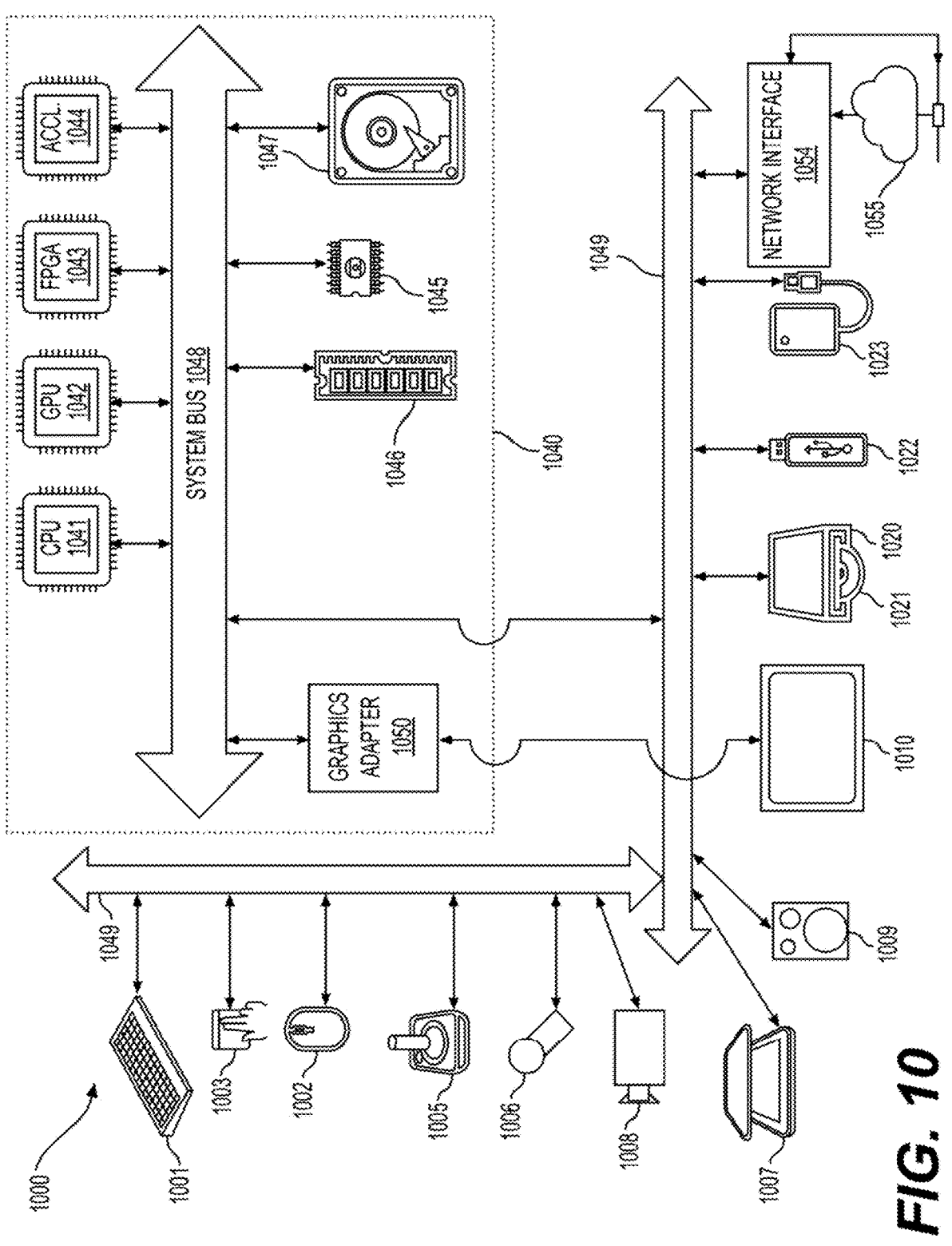
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for image rendering, comprising:

generating, by processing circuitry and based on geometry information of pixels in a frame, compressed geometry information that is to be-buffered in a geometry buffer (G-buffer), the compressed geometry information (i) comprising a first texture component for first pixels of the pixels and (ii) not comprising the first texture component for a second pixel of the pixels, the second pixel having one or more neighboring pixels in the first pixels;

accessing, by the processing circuitry, the geometry buffer, to obtain the compressed geometry information;

generating, by the processing circuitry, reconstructed geometry information of the pixels based on the compressed geometry information, the reconstructed geometry information comprising the first texture component for the first pixels and a reconstructed first texture component for the second pixel that is reconstructed based on the first texture component of the one or more neighboring pixels in the first pixels; and performing, by the processing circuitry, a rendering to generate an image according to the reconstructed geometry information of the pixels.

2. The method of claim 1, wherein the compressed geometry information comprises the first texture component for the first pixels, and a second texture component for second pixels, the first pixels have a first checkerboard pattern, and the second pixels have a second checkerboard pattern that is complementary to the first checkerboard pattern.

3. The method of claim 2, further comprising:

buffering the first texture component for the first pixels and the second texture component for the second pixels in a channel of the geometry buffer.

4. The method of claim 2, wherein for a quad of 2 by 2 pixels that includes first two pixels in a first diagonal direction, and second two pixels in a second diagonal direction, the generating the compressed geometry information comprises:

buffering the first texture component of the first two pixels and the second texture component of the second two pixels in a channel space for the quad.

5. The method of claim 4, wherein the generating the reconstructed geometry information further comprises:

determining the second texture component of the first two pixels based on the second texture component of the second two pixels; and determining the first texture component of the second two pixels based on the first texture component of the first two pixels.

6. The method of claim 5, further comprising:

defining a full screen primitive to be a triangle that covers a screen space for displaying the image; and generating the reconstructed geometry information by quads that start with even pixel coordinates.

7. The method of claim 4, wherein the performing the rendering further comprises:

performing, by a first processing unit, first operations on the first texture component for a pixel in the first two pixels to generate first intermediate result;

performing, by a second processing unit, second operations on the second texture component for a pixel in the second two pixels to generate second intermediate result;

exchanging the first intermediate result and the second intermediate result between the first processing unit and the second processing unit;

performing, by the first processing unit, a rendering for the pixel in the first two pixels based on the first intermediate result and the second intermediate result; and performing, by the second processing unit, a rendering for the pixel in the second two pixels based on the first intermediate result and the second intermediate result.

8. The method of claim 1, wherein the second pixel has a first neighboring pixel along a first direction and a second neighboring pixel along a second direction, and the generating the reconstructed geometry information further comprises:

determining, from the first direction and the second direction, a direction along which a function has a smaller gradient; and reconstructing the first texture component for the second pixel based on one of the first neighboring pixel and the second neighboring pixel that is along the direction.

9. The method of claim 8, wherein the reconstructing the first texture component for the second pixel further comprises:

performing an inverse math calculation of an inter-pixel gradient associated with the second pixel to obtain the first texture component of the second pixel.

10. The method of claim 8, wherein the function is pre-defined to indicate a discontinuity for a surface property.

11. The method of claim 10, wherein the surface property comprises at least one of a depth property and a material property.

12. The method of claim 1, wherein the first texture component comprises at least one of a color component, a surface normal and a surface depth.

13. An apparatus, comprising processing circuitry configured to:

generate, based on geometry information of pixels in a frame, compressed geometry information that is to be-buffered in a geometry buffer (G-buffer), the compressed geometry information (i) comprising a first texture component for first pixels of the pixels and (ii) not comprising the first texture component for a second pixel of the pixels, the second pixel having one or more neighboring pixels in the first pixels;

access, the geometry buffer, to obtain the compressed geometry information;

generate, reconstructed geometry information of the pixels based on the compressed geometry information, the reconstructed geometry information comprising the first texture component for the first pixels and a reconstructed first texture component for the second pixel that is reconstructed based on the first texture component of the one or more neighboring pixels in the first pixels; and perform a rendering to generate an image according to the reconstructed geometry information of the pixels.

14. The apparatus of claim 13, wherein the compressed geometry information comprises the first texture component for the first pixels, and a second texture component for second pixels, the first pixels have a first checkerboard pattern, and the second pixels have a second checkerboard pattern that is complementary to the first checkerboard pattern.

15. The apparatus of claim 14, wherein the processing circuitry is configured to:

buffer the first texture component for the first pixels and the second texture component for the second pixels in a channel of the geometry buffer.

16. The apparatus of claim 14, wherein for a quad of 2 by 2 pixels that includes first two pixels in a first diagonal direction, and second two pixels in a second diagonal direction, wherein the processing circuitry is configured to:

buffer the first texture component of the first two pixels and the second texture component of the second two pixels in a channel space for the quad.

17. The apparatus of claim 16, wherein the processing circuitry is configured to:

determine the second texture component of the first two pixels based on the second texture component of the second two pixels; and determine the first texture component of the second two pixels based on the first texture component of the first two pixels.

18. The apparatus of claim 17, wherein the processing circuitry is configured to:

define a full screen primitive to be a triangle that covers a screen space for displaying the image; and generate the reconstructed geometry information by quads that start with even pixel coordinates.

19. The apparatus of claim 16, wherein the processing circuitry comprises a first processing unit and a second processing unit, the processing circuitry is configured to:

perform, by the first processing unit, first operations on the first texture component for a pixel in the first two pixels to generate first intermediate result;

perform, by the second processing unit, second operations on the second texture component for a pixel in the second two pixels to generate second intermediate result;

exchange the first intermediate result and the second intermediate result between the first processing unit and the second processing unit;

perform, by the first processing unit, a rendering for the pixel in the first two pixels based on the first intermediate result and the second intermediate result; and perform, by the second processing unit, a rendering for the pixel in the second two pixels based on the first intermediate result and the second intermediate result.

20. The apparatus of claim 13, wherein the second pixel has a first neighboring pixel along a first direction and a second neighboring pixel along a second direction, and the processing circuitry is configured to:

determine, from the first direction and the second direction, a direction along which a function has a smaller gradient; and reconstruct the first texture component for the second pixel based on one of the first neighboring pixel and the second neighboring pixel that is along the direction.

* * * * *